(12) United States Patent
Miller et al.

(10) Patent No.: US 7,735,395 B2
(45) Date of Patent: Jun. 15, 2010

(54) EXTERNAL SPEED SENSOR AND METHOD

(75) Inventors: Kent A. Miller, Pinckney, MI (US); Heidi L. Simmons, Belleville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1324 days.

(21) Appl. No.: 11/155,020

(22) Filed: Jun. 16, 2005

(65) Prior Publication Data

US 2006/0023403 A1 Feb. 2, 2006

Related U.S. Application Data

(60) Provisional application No. 60/589,245, filed on Jul. 20, 2004.

(51) Int. Cl.
- F16H 57/02 (2006.01)
- F16H 57/04 (2006.01)
- H02G 3/04 (2006.01)
- H02G 3/18 (2006.01)
- H01R 33/00 (2006.01)

(52) U.S. Cl. ........... 74/606 R; 174/72 A; 174/652; 439/34

(58) Field of Classification Search ......... 74/606 R, 74/502.4, 502.6; 174/72 A, 151, 652; 439/318
See application file for complete search history.

(56) References Cited

U.S. PATENT DOCUMENTS

| 4,454,381 | A | * | 6/1984 | Ito et al. ............ 174/151 |
|---|---|---|---|---|
| 4,988,309 | A | * | 1/1991 | Garretson ............ 439/318 |
| 5,352,853 | A | * | 10/1994 | Takagi ............ 174/652 |
| 5,616,046 | A | * | 4/1997 | Sundstrom et al. ........ 439/367 |
| 5,929,536 | A | * | 7/1999 | Stoll et al. ............ 307/38 |
| 2001/0023776 | A1 | * | 9/2001 | Zingheim ............ 174/72 A |

FOREIGN PATENT DOCUMENTS

JP          3-37975      *  2/1991

* cited by examiner

*Primary Examiner*—Vinh T. Luong
(74) *Attorney, Agent, or Firm*—Quinn Law Group, PLLC

(57) ABSTRACT

An electronic communication wire connecting an input speed sensor and a computer controller in a transmission system is provided. The electronic communication wire connects at one end to the input speed sensor through a first aperture in the transmission case and at the other end to the computer controller through a second aperture in the transmission case. Thus, the electronic communication wire is attached at both ends to internal devices but it partially exists external to the transmission case along the length of the electronic communication wire. The connection between the electronic communication wire and the input speed sensor is sealed with at least a single O-ring while the connection between the electronic communication wire and the computer controller is sealed with at least a pair of O-rings. A method of electronically connecting the input speed sensor and the computer controller externally of the transmission case is also provided.

9 Claims, 3 Drawing Sheets

EXTERNAL SPEED SENSOR AND METHOD

CROSS REFERENCE TO RELATED APPLICATIONS

This Application claims the benefit of U.S. Provisional Application 60/589,245, filed Jul. 20, 2004, which is hereby incorporated by reference in its entirety.

TECHNICAL FIELD

The present invention relates to an electronic communication wire of a transmission case having an externally-mounted feature.

BACKGROUND OF THE INVENTION

In a vehicle transmission system, an electronic communication wire transmits information collected by an input speed sensor to a computer controller. In a prior art transmission system, the electronic communication wire is routed through an internal area of the transmission case casting. The prior art internal area of casting is generally situated at the exterior of the transmission case opposite a piston pocket. The process of casting the area for internal electronic communication includes casting a large mass adjacent to the piston pocket. This mass increases the likelihood of porosity in the transmission case in the surrounding area. Manufacturing such an internal passage then requires angled machining to form the passage through the casting. Machining through a porous mass in the seal bore of the piston pocket could render the case unusable.

In one transmission system, the computer controller is situated adjacent to an area where sump oil is held. Sump oil may become aerated if allowed to communicate with rotating parts. Aerated sump oil may create foam and add accumulation to the transmission. Thus, it is important to restrict sump oil from the transmission's rotating parts.

FIG. 1 illustrates a prior transmission case 10' design, which has been improved by the present invention. The prior transmission case 10' includes an internal communication aperture 100 which provides a passage for electronic communication wires 102, 104 to connect an input speed sensor and a computer controller. The process of forming the internal communication aperture 100 requires angled machining through a casting behind the piston bore 106 of the transmission case 10'. The casting process is followed by angled machining, which could open potential porosity in the transmission case wall 108 at the piston bore 106.

SUMMARY OF THE INVENTION

The present invention directs the electronic communication wire to the computer controller along a path that does not require angled machining behind the piston bore and, thus, avoids the potential of a porous transmission case. Further, the electronic communication wire is directed to a computer controller along a path external to the transmission case. The present invention also prevents sump oil from gaining access to the moving parts located in the transmission case while providing electronic communication between an input speed sensor and a computer controller.

In summary, the transmission case design of the present invention provides for electronic communication between an input speed sensor and a computer controller of a transmission system. The transmission case has a first aperture to allow access to the input speed sensor and a second aperture to allow access to the computer controller. A portion of an electronic communication wire, enclosed in a flexible sheath, exists external to the transmission case and connects to the input speed sensor via the first aperture and to the computer controller via the second aperture. The wire connects to the second aperture adjacent to an area where sump oil is held. Thus, the connection at the second aperture is sealed with two O-ring seals to prevent sump oil from exiting the sump area of the transmission case via the second aperture. The connection at the first aperture, however, is only subject to incidental oil contact and, thus, only requires a single O-ring seal. At least one rib extends from the transmission case adjacent to the input speed sensor and electronic communication wire. The rib projects further from the transmission case than the input speed sensor and electronic communication wire to protect the input speed sensor and electronic communication wire from damage, particularly during transit and assembly.

Further, a transmission case for a transmission system is provided. The transmission case houses a computer controller, an input speed sensor, and an electric communication wire. The electric communication wire connects the input speed sensor and the computer controller. The transmission case has the electric communication wire located external to the transmission case, a first aperture in the transmission case adapted for access to the input speed sensor, and a second aperture in the transmission case providing access to the computer controller. The transmission case also comprises an external connector including the electric communication wire having an input speed sensor plug, which is engageable with the first aperture, and a computer controller plug, which is engageable with the second aperture. Further, at least one rib is located on the transmission case sufficiently adjacent to the first aperture to partially enclose at least one of the input speed sensor plug and the electronic communication wire.

Another aspect of the invention provides an electronic communication wire connector. The electronic communication wire connector is adapted for use with a transmission case housing a computer controller and an input speed sensor. The transmission case has a first access to the input speed sensor and a second access to the computer controller. The electronic communication wire connector is locatable external to the transmission case to provide electronic communication between the input speed sensor via the first access and the computer controller via the second access.

The present invention also provides a method of connecting a computer controller and an input speed sensor housed in a transmission case. The method includes forming a first aperture in the transmission case providing access to the input speed sensor, forming a second aperture in the transmission case providing access to the computer controller, and connecting the input speed sensor with the computer controller externally of the transmission case and between the first aperture and the second aperture.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
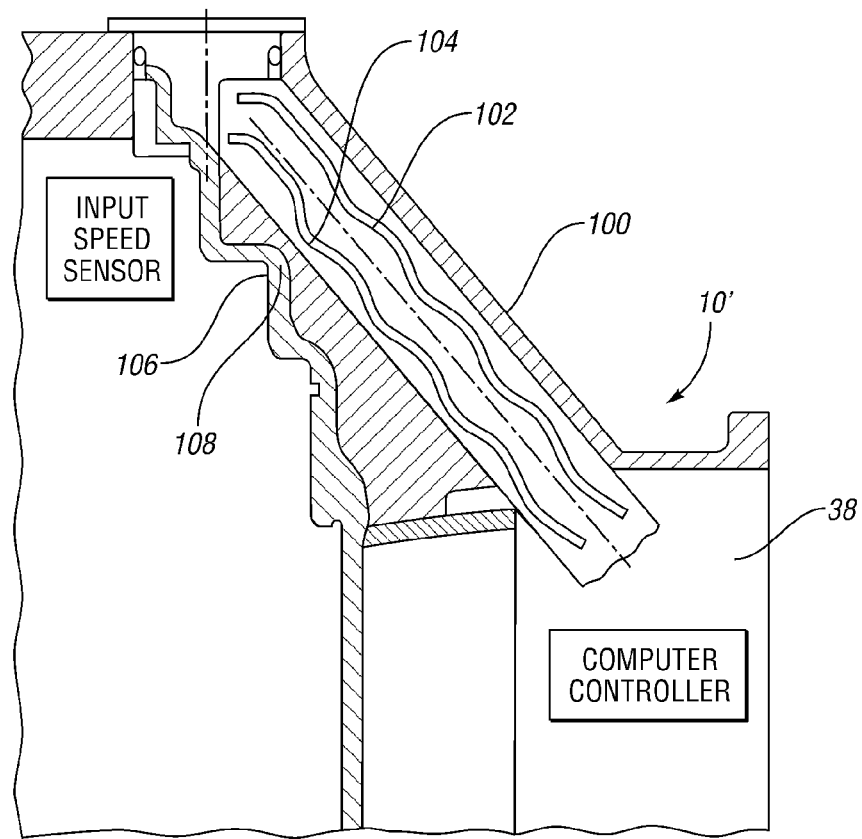
FIG. 1 is a fragmentary schematic cross-section of a prior transmission case design improved by the present invention.
Figure 2:
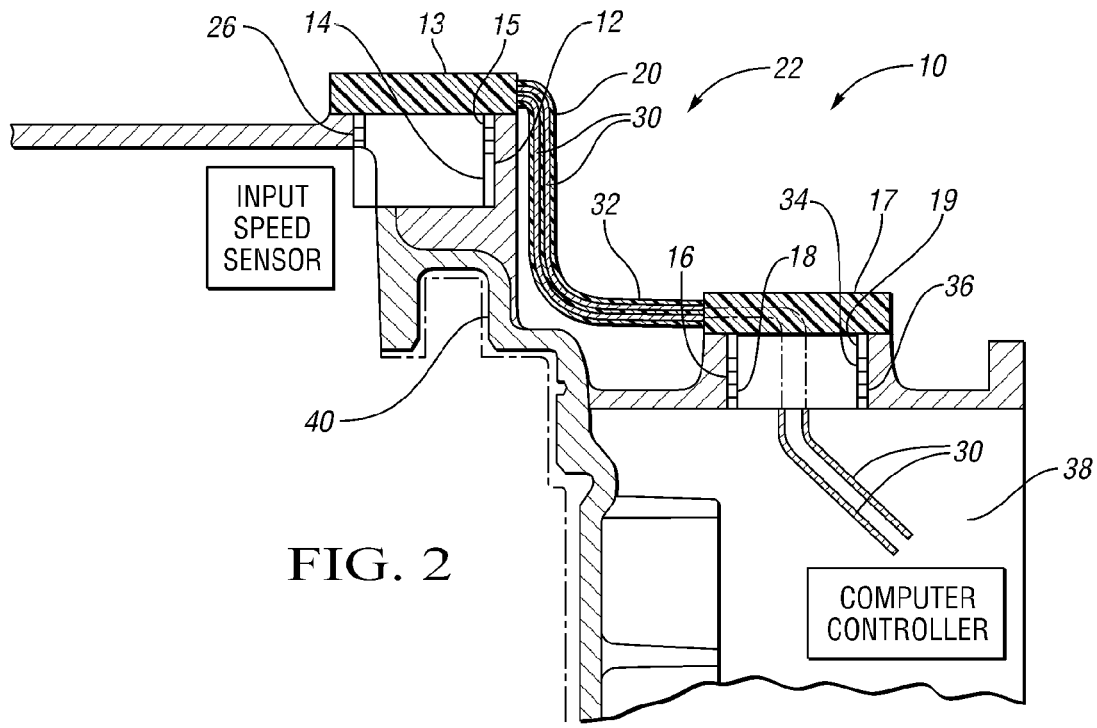
FIG. 2 is a fragmentary schematic cross-sectional view of the transmission case in accordance with the present invention.

FIG. 2 illustrates an embodiment of a portion of a transmission case 10 in accordance with the present invention. The case has a first aperture 12 aligned to provide access for an input speed sensor plug 14. The case has a second aperture 16 aligned to provide access for a computer controller plug 18. An electronic communication wire 20 connects the input speed sensor plug 14 to the computer controller plug 18 to provide an external connector 22 for electronic communication between a speed sensor and a computer controller within the transmission case 10. The electronic communication wire 20 connects to the input speed sensor plug 14 which is adapted to plug into the first aperture 12, and sealed with a single O-ring 26 to prevent incidental oil from exiting a sump area 38 of the transmission case 10 at the first aperture 12, particularly when the vehicle is in motion. The electronic communication wire 20 is comprised of a pair of wires 30 which run through a sleeve flexible covering 32 between the input speed sensor plug 14 and the computer controller plug 18 to connect the input speed sensor at the first aperture 12 to the computer controller at the second aperture 16. The sleeve 32 may be a flexible coating adhered to the electronic communication wire 20. The sleeve 32 may also be a flexible tube into which the electronic communication wire 20 is removably inserted. The second aperture 16 may be sealed with a pair of O-rings 34, 36. A pair of O-rings 34, 36 is appropriate at the second aperture 16 because sump oil is stored in the sump area 38 adjacent to the second aperture 16. The pair of O-rings 34, 36 prevents sump oil from leaking around the second aperture 16 and dripping out of the transmission case externally.

The piston pocket 40 of the transmission case 10 is also illustrated in FIG. 2. The piston pocket 40 is generally cast into the transmission case 10. A bore seal (not shown) is utilized in the piston pocket 40. If the piston pocket 40 is porous along its inner surface, the bore seal therealong cannot form a tight seal between the piston pocket 40 and, thus, the surface of the piston and the transmission case 10 is unusable. The present invention does not require a large casting adjacent to the piston pocket 40 and, therefore, reduces the risk of porosity in the piston pocket 40.

Figure 3:
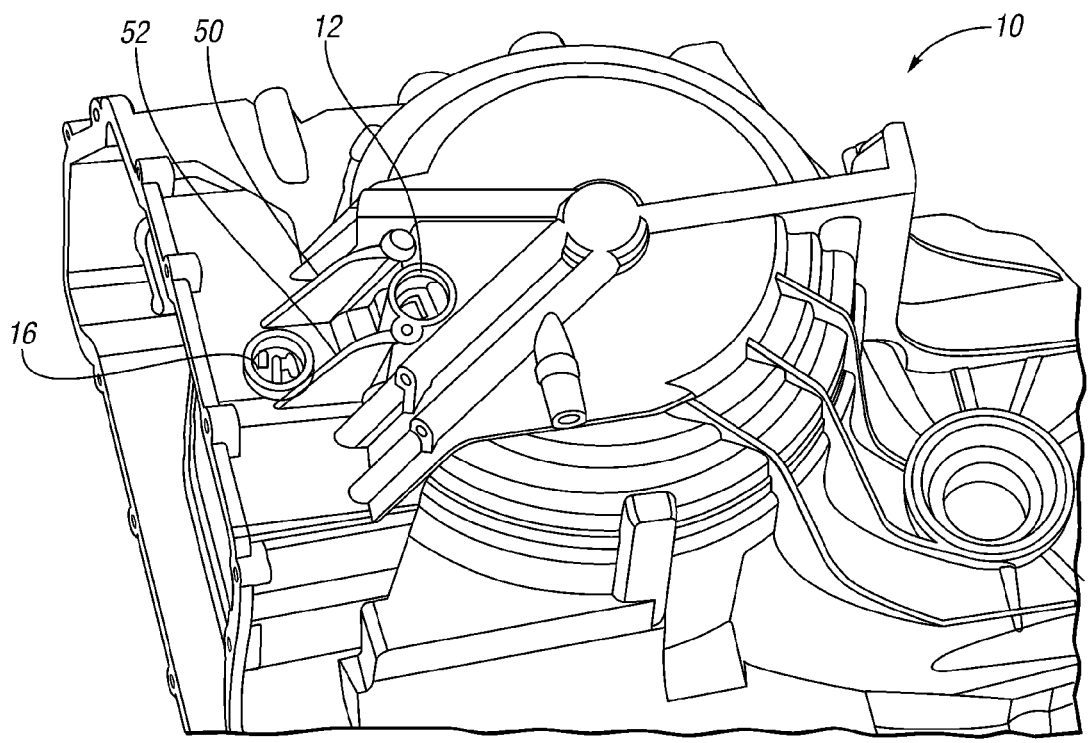
FIG. 3 is a fragmentary perspective view of the transmission case in accordance with the present invention with an external electronic communication wire removed.

FIG. 3 illustrates an exterior view of a portion the transmission case 10 in accordance with the present invention. The first aperture 12 and second aperture 16 of the transmission case 10 form the input speed sensor plug receptacle and the computer controller plug receptacle, respectively. Ribs 50, 52 are formed in the transmission case 10 adjacent to a path between the first aperture 12 and the second aperture 16. Referring to FIGS. 2 and 3, ribs 50, 52 provide protection for the top of the input speed sensor plug 14 and the encased pair of wires 30 when the connector 22 is attached to the transmission case 10, as defined in FIG. 2. The ribs 50, 52 extend further from the surface of the transmission case 10 than the top of the input speed sensor plug 14 and the connector 22 to protect them from damage, particularly during transit and assembly.

Figure 4:
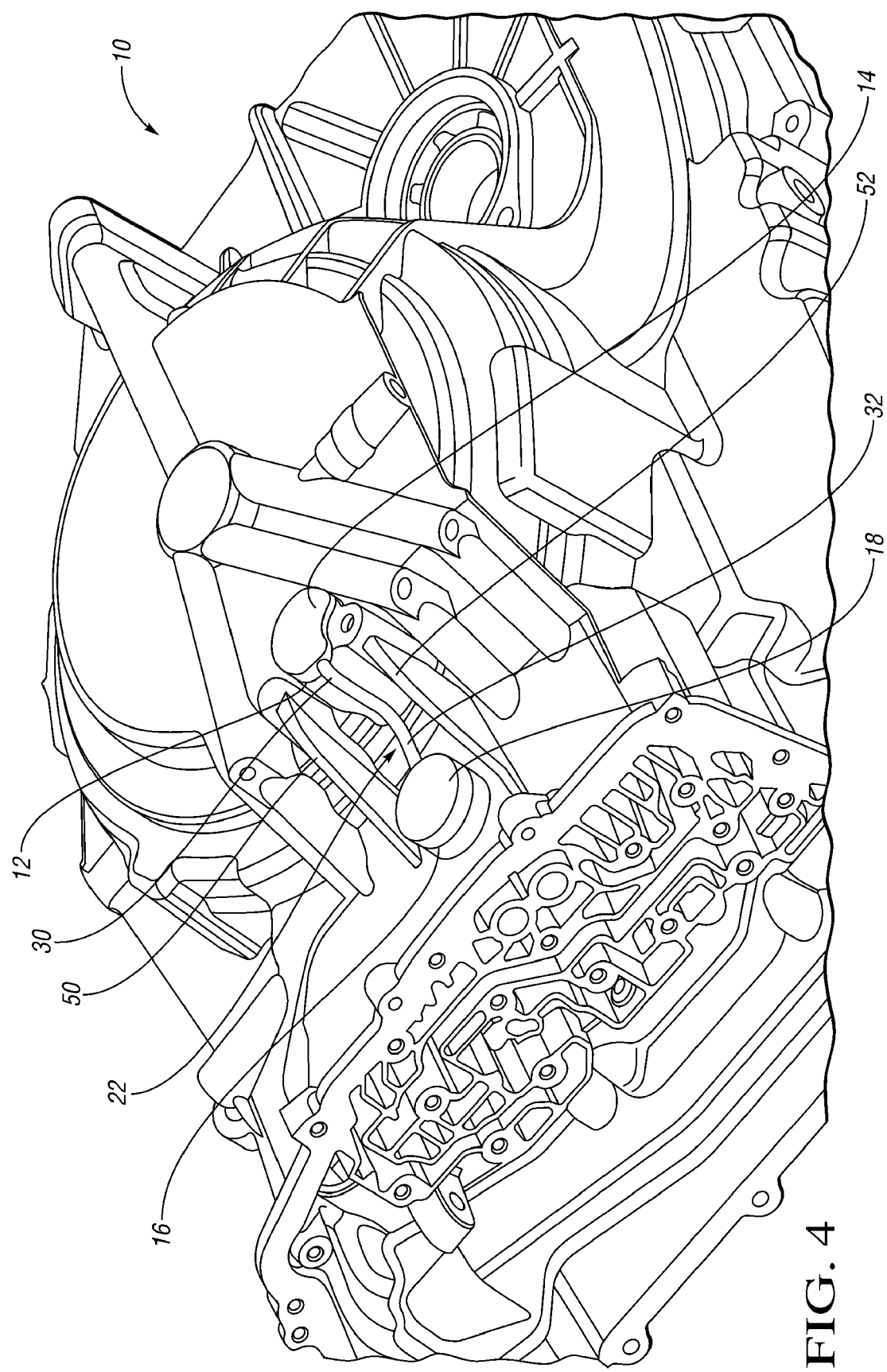
FIG. 4 is a fragmentary perspective view of the transmission case in accordance with the present invention with the external electronic communication wire of this invention installed.

FIG. 4 illustrates a portion of the transmission case 10 with the external connector 22 plugged into the first and second apertures 12, 16 or plug receptacles. The transmission case 10 has the first aperture 12 and the second aperture 16 formed to receive the input speed sensor plug 14 and computer controller plug 18, respectively. The pair of wires 30 provides electronic communication between the input speed sensor and the computer controller.

Figure 5:
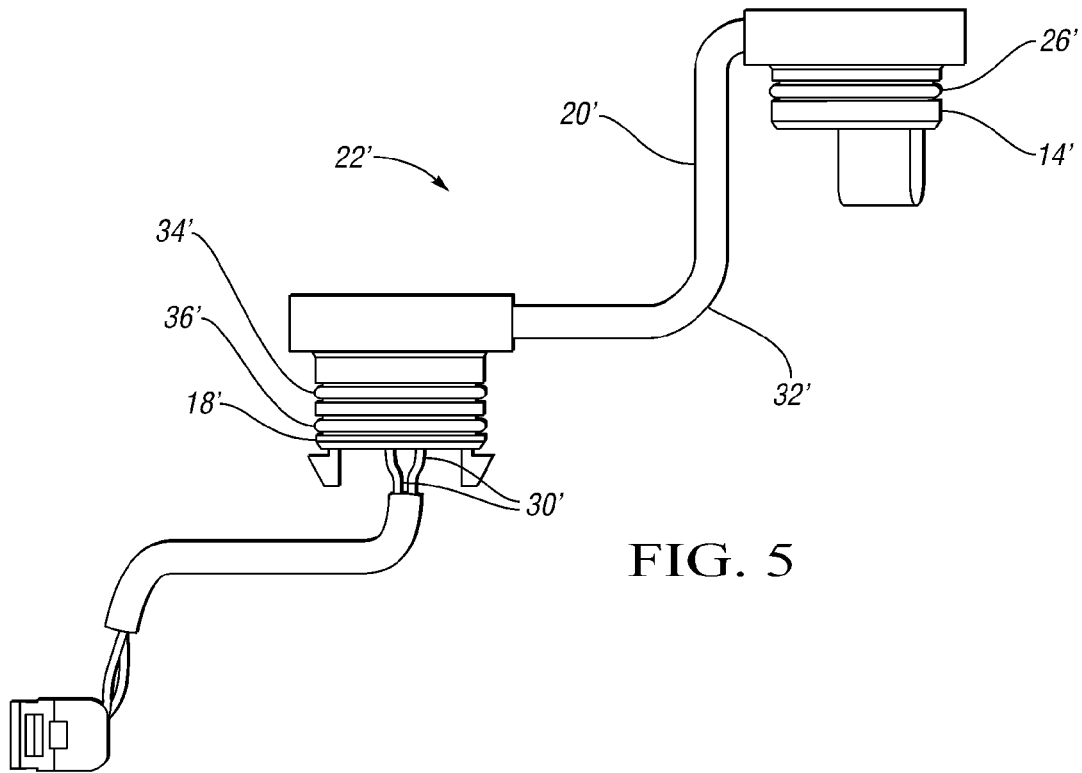
FIG. 5 is a schematic side view of a second embodiment of the present invention.

FIG. 5 illustrates a second embodiment of the present invention 22'. The input speed sensor plug 14' and the computer controller plug 18' are connected by the electronic communication wire 20'. The electronic communication wire 20' consists of a pair of wires 30' encased in a sleeve 32'. The input speed sensor plug 14' includes a single O-ring 26' and the computer controller plug 18' includes a pair of O-rings 34', 36'.

As illustrated in FIG. 2, the invention also provides an electronic communication wire connector 22 adapted for use with a transmission case 10. The electronic communication wire connector 22 has a first end 13 including an input speed sensor plug 14 and a second end 17 including computer controller plug 18. The input speed sensor plug 14 is adapted to plug into a first access 15 to the input speed sensor and the computer controller plug 18 is adapted to plug into a second access 19 to the computer controller. An external electronic communication wire 20 exists between the plugs 14, 18 to define a path adapted for electronic communication external to the transmission case 10. Although the first access 15 and second access 19 are illustrated in FIG. 2 as apertures that the input speed sensor plug 14 and computer controller plug 18 plug into they may be of any design that provides for electronic communication between the computer controller and the input speed sensor.

The present invention also provides a method of connecting a computer controller and an input speed sensor housed in a transmission case 10, as viewed in FIGS. 2, 3, and 4. The method comprises forming a first aperture 12 in the transmission case 10 providing access to the input speed sensor and forming a second aperture 16 in the transmission case 10 providing access to the computer controller. The method also comprises connecting the input speed sensor with the computer controller externally of the transmission case 10 and between the first aperture 12 and the second aperture 16.

While the best modes for carrying out the invention have been described in detail, those familiar with the art to which this invention relates will recognize various alternative designs and embodiments for practicing the invention within the scope of the appended claims.

The invention claimed is:

1. A transmission case assembly having a transmission case housing a computer controller, an input speed sensor, and an electronic communication wire connecting the input speed sensor and the computer controller, said transmission case assembly comprising:
   the electronic communication wire being located external to the transmission case;
   a first aperture formed in said transmission case providing access to the input speed sensor;
   a second aperture formed in said transmission case providing access to the computer controller;
   an external connector including said electronic communication wire having an input speed sensor plug configured to be engaged with said first aperture and a computer controller plug configured to be engaged with said second aperture; and at least one upstanding rib on said transmission case sufficiently adjacent to said first aperture to partially protect at least one of said input speed sensor plug and said electronic communication wire from damage.

2. The transmission case assembly of claim 1, wherein the electronic communication wire is covered with a flexible sleeve.

3. The transmission case assembly of claim 1, wherein the at least one rib protects the input speed sensor from damage.

4. The transmission case assembly of claim 1, wherein the at least one rib protects the electronic communication wire from damage.

5. The transmission case assembly of claim 1, including a first seal between the first aperture and the input speed sensor plug and a second seal between the second aperture and the computer controller plug.

6. The transmission case assembly of claim 1, wherein a seal between the electronic communication wire and the computer controller plug is comprised of two or more O-ring seals.

7. The transmission case assembly of claim 1, wherein said input speed sensor has an access and said input speed sensor plug is configured to be engaged with said access to provide electronic communication to said input speed sensor.

8. The transmission case assembly of claim 1, wherein said computer controller has an access and said computer controller plug is configured to be engaged with said access to provide electronic communication to said computer controller.

9. The transmission case assembly of claim 1, wherein said at least one upstanding rib on said transmission case is adjacent to a path between said first aperture and said second aperture.

* * * * *